Patented Jan. 8, 1952

2,581,916

UNITED STATES PATENT OFFICE 2,581,916

FORMATION OF TERPENE ARYL ETHERS

Leland J. Kitchen, Akron, Ohio, assignor to The Firestone Tire & Rubber Company, Akron, Ohio, a corporation of Ohio No Drawing. Application February 21, 1948, Serial No. 10,183

5 Claims. (Cl. 260—611)

This invention relates to the production of terpene aryl ethers in which the terpene group is bicyclic and is derived from a bicyclic or tricyclic terpene hydrocarbon of the empirical formula $C_{10}H_{16}$.

The terpene hydrocarbons which may be utilized are those which undergo reaction with the formation of bornyl and isobornyl groups. Bicyclic terpene hydrocarbons which may be used are camphene, nopinene, and alpha pinene. The tricyclic terpene hydrocarbon, tricyclene, reacts with the formation of an isobornyl derivative and may be used in the process of the invention.

According to this invention aryl ethers of such terpenes are produced by condensing the terpene with a phenol in the presence of an acid catalyst. A relatively low temperature is employed. Temperatures below −30° C. retard the reaction so that it is too time consuming to be used commercially. With nopinene and alpha pinene, ring cleavage takes place at temperatures above about 5° C. with production of dipentene and its reaction products. Hence, with these hydrocarbons the temperature range for commercial production of the aryl ethers is −30 to +5° C. Temperatures up to about +30° C. may be used in the commercial production of aryl ethers from camphene and tricyclene, the temperature being controlled by regulation of the catalyst concentration and/or external cooling to prevent an uncontrollable exothermic reaction setting in. At temperatures above about 30° C. rearrangement of the ether to a terpene-substituted phenol occurs. By preventing such rearrangement very high yields of ethers are obtainable.

The acid catalysts which may be used include boron trifluoride, boron trichloride, aluminum trifluoride, aluminum trichloride, aluminum tribromide, stannic fluoride, stannic chloride, sulfuric acid, benzenesulfonic acid, toluenesulfonic acid, naphthalenesulfonic acid, sodium acid sulfate, zinc chloride, zinc bromide, hydrogen fluoride, phosphoric acid, perchloric acid, ferric chloride, and the like.

The phenols which may be used in carrying out the reaction include the various cresols and xylenols, mesitol, pseudocumenol, cumenol, hemellithenol, durenol, 2,3,4,5-tetramethylphenol, 2,3,4,6-tetramethylphenol, pentamethylphenol, o-ethylphenol, m-ethylphenol, p-ethylphenol, diethylphenol, methylethylphenol, n-propylphenol, o-isopropylphenol, p-isopropylphenol, 2,4-diisopropylphenol, carvacrol, thymol, 2,4,6-triisopropylphenol, o-tert-butylphenol, p-tert-butylphenol, 2,4-ditert-butylphenol, the various long-chain alkyl-substituted phenols such as p-tert-octylphenol, m-pentadecylphenol, p-octadecylphenol, alicyclic phenols such as p-cyclohexylphenol, p-menthylphenol, and p-isobornylphenol, halophenols such as pentafluorophenol, pentachlorophenol, mono-, di-, and trichlorophenols, chlorocresols, nitrosophenol, nitrophenol, nitrocresol, alkoxy and aryloxy phenols such as o-methoxyphenol, p-ethoxyphenol, p-(2-ethoxyethoxy)phenol, p-phenoxyphenol, the napthols, hydroquinone, methylhydroquinone, di-tert-butylhydroquinone, catechol, resorcinol, etc. The substituent may be unsaturated; thus the phenol may be eugenol, o-allylphenol, chavicole, m-pentadecenylphenol, etc.

The following examples are illustrative of the process. The boron fluoride catalyst mentioned in the examples consisted of 45 per cent boron trifluoride in ether:

EXAMPLE 1

*Isobornyl phenyl ether*

272 grams of camphene was mixed with 188 grams of phenol. To the stirred mixture maintained at a temperature between −1 and +15° C. was added 6.5 grams of $BF_3$ (45 per cent solution in ether). In 120 minutes the reaction was stopped by addition of aqueous alkali. Distillation yielded phenyl isobornyl ether, a water-white liquid with a faint odor, which was obtained in 82 per cent yield. The isobornyl phenyl ether had the following properties: B. P. 151° C./10 mm., 167° C./20 mm., 295° C./744 mm.; $n_D^{20}=1.5265$, $n_D^{25}=1.5241$, $n_D^{30}=1.5221$; $d_4^{20}=1.0058$; $M_D=70.36$ (calcd., 69.73).

EXAMPLE 2

*Isobornyl o-tolyl ether*

A mixture of 136 grams camphene and 122 grams o-cresol, stirred and cooled to −5° to 10° C. was treated with 2 ml. of $BF_3$-ether catalyst during thirty minutes. A few minutes later the mixture crystallized to a mushy solid. After an hour the solid was shaken with NaOH solution and petroleum ether. The oil layer, distilled, yielded isobornyl o-tolyl ether in 88 per cent yield. The product, a colorless liquid with a very slight odor, had B. P. 164.5° C./10 mm. and $n_D^{20}=1.5274$ (supercooled liquid); it crystallized when cooled. Recrystallized from acetone, it had M. P. 48.5–48.8° C.

Analysis: Calcd. for $C_{17}H_{24}O$: C, 83.55%; H, 9.90%. Found: C, 83.73%; H, 10.03%.

EXAMPLE 3

Isobornyl p-tolyl ether 220 grams of p-cresol was mixed with 214 grams of camphene and 9 grams of $BF_3$ (45 per cent ether solution). The reaction mixture was kept below 10° C. for eleven days. A somewhat viscous liquid with a light-yellow tinge and a slight odor was obtained in a yield of 95 per cent. The isobornyl p-tolyl ether had the following properties: B. P. 164.5° C./10 mm.; $n_D^{20}=1.5190$; $d_4^{20}=0.9833$; $M_D=75.43$ (Calcd., 74.35).

EXAMPLE 4

Isobornyl 2,4-dimethylphenyl ether

A solution of camphene dissolved in an equivalent amount of 2,4-dimethylphenol (Tech. grade with a melting point of 18 to 20.5° C.) was treated with 2 per cent of benzene sulfonic acid (70 per cent) at a temperature of 0 to 5° C. and allowed to stand for several days. The yield was 95 to 98 per cent. Isobornyl 2,4-dimethylphenyl ether has a boiling point of 154° C./3 mm., or 176° C./10 mm. On recrystallization from 3:1 alcohol-acetone it had a melting point of 57.6–57.8° C.: $n_D^{23}=1.5230$ (super cooled liquid).

Analysis: Calcd. for $C_{18}H_{26}O$: C, 83.66%; H, 10.14%; M. W., 258.39. Found: C, 83.55%; H, 10.42%; M. W., 255 (micro-Rast).

EXAMPLE 5

Isobornyl 3,5-dimethylphenyl ether 136 grams of camphene and 122 grams of 3,5-dimethylphenol were mixed with 3 grams of $BF_3$ (45 per cent solution in ether) in 100 ml. toluene at −3 to +5° C. On completion of the reaction a yield of 84 per cent of isobornyl 3,5-dimethylphenyl ether was obtained from the reaction mixture. The product was a colorless liquid with a peculiar odor. Identifying characteristics were found to be: B. P. 173.5° C./mm.; $n_D^{20}=1.5240$; $d_4^{20}=0.9843$; $M_D=80.32$ (Calcd., 78.96).

EXAMPLE 6

Isobornyl p-methoxyphenyl ether

Equal molecular proportions of camphene and p-methoxyphenol were reacted with about 1 per cent of $BF_3$ (45 per cent solution in ether) as catalyst. The temperature was not allowed to rise above 5 to 10° C. After one hundred forty-five minutes the reaction mixture was worked up in the manner described in the previous examples. A yield of 85 per cent was obtained. The product is characterized by the following: B. P. 183° C./10 mm.; $n_D^{20}=1.5278$; $d_4^{20}=1.0388$ (super-cooled); $M_D=77.15$ (Calcd., 75.99); M. P. 35.6–36.1° C. (alcohol).

Analysis: Calcd. for $C_{17}H_{24}O_2$: C, 78.42%; H, 9.29%. Found: C, 78.40%; H, 9.39%.

EXAMPLE 7

Isobornyl p-fluorophenyl ether 18 grams camphene and 11.8 grams p-fluorophenol were dissolved in 50 ml. petroleum ether. The solution was cooled to −5 to −10° C. and 0.5 ml. $BF_3$ (45 per cent solution) was added with stirring over a period of 90 minutes. The reaction mixture was washed with sodium hydroxide solution and then distilled. The yield was 86 per cent of isobornyl p-fluorophenyl ether, a colorless liquid with a boiling point of 151° C./10 mm.; $n_D^{20}=1.5111$; $d_4^{20}=1.044$; $M_D=71.25$ (Calcd., 70.97).

EXAMPLE 8

Isobornyl p-tert-amylphenyl ether 136 grams camphene and 164 grams p-tert-amylphenol, mixed with 400 ml. benzene-petroleum ether were cooled to 0–10° C. and stirred while 2 ml. of $BF_3$-ether catalyst was added during thirty minutes; the mushy solid present dissolved. Ninety minutes later the reaction mixture was washed with hot 5 per cent NaOH solution. Distillation yielded 252 grams (84 per cent yield) of isobornyl p-tert-amylphenyl ether, B. P. mainly 199° C./10 mm., a viscous colorless liquid of refractive index $n_D^{20}=1.5188$ and density $d_4^{20}=0.9698$, which crystallized to a mush on standing. Recrystallized from alcohol, it had M. P. 48.8–49.2° C.

Analysis: Calcd. for $C_{21}H_{32}O$: C, 83.94%; H, 10.74%. Found: C, 84.15%; H, 10.91%.

EXAMPLE 9

Isobornyl 2,4-dichlorophenyl ether 163 grams 2,4-dichlorophenol and 136 grams camphene, dissolved in 200 ml. benzene-carbon tetrachloride, were cooled to 0° C. 5 ml. $BF_3$-ether catalyst was added to the stirred, cooled mixture during sixty minutes; solid 2,4-dichlorophenol which had crystallized out soon dissolved. Three hours after the initial catalyst addition the reaction was stopped by addition of NaOH solution. The reaction mixture yielded 77 per cent isobornyl 2,4-dichlorophenyl ether, which distilled as a somewhat viscous colorless liquid, boiling point 195.5° C./10 mm., $n_D^{20}=1.5480$, $d_4^{20}=1.167$ (supercooled liquid), $M_D=81.45$ (calcd., 70.97), which soon crystallized to a white solid. Recrystallized from petroleum ether, M. P. 61.0–61.4° C.

Analysis: Calcd. for $C_{16}H_{20}OCl_2$: C, 64.22%; H, 6.74%; Cl, 23.70%. Found: C, 63.90%; H, 6.88%; Cl, 23.72%.

EXAMPLE 10

Bornyl 2,4-dimethylphenyl ether

Pure 1-nopinene was prepared by fractional distillation of commercial beta-pinene; it had $n_D^{20}=1.4788$ and $a_D^{24}$ (10 cm.) =−18.53°. The main portion of the 2,4-dimethylphenol (M. P. 23–24°) was mixed with 324 grams of the 1-nopinene with stirring and cooling to a temperature of −5° in a bath of ice and concentrated HCl. During stirring 1.6 grams $BF_3$-ether catalyst dissolved in the remainder of the total of 251 grams of 2,4-dimethylphenol was added with stirring, during a period of an hour. After another hour the flask was stoppered and left overnight in a refrigerator maintained at 5° C. The reaction mixture contained 213 grams of unreacted 2,4-dimethylphenol which was removed by extraction with a base. It also contained 262 grams of nopinene. The main portion of the recovered nopinene was tested and found to have $$n_D^{20}=1.4774$$

and $a_D^{24}$ (10 cm. tube) =−21.38°. The lowered refractive index and increased rotation indicated that about 10 per cent of the nopinene had isomerized to 1-alpha-pinene, which is characterized by $n_D^{20}=1.4652$ and $a_D^{25}$ (2 dm.) =−80.75° C. The remainder of the reaction mixture, after distillation of a 12 gram forerun, yielded fifty-nine grams of bornyl 2,4-dimethylphenyl ether, a colorless liquid collected as the following two fractions having identical optical rotations:

First fraction: 18 g. of B. P. 175.5–181.5° C./10 mm.; $n_D^{20}$=1.5245; $\alpha_D^{23}$ (10 cm.) = −40.0°.

Second fraction: 41.0 gr. of B. P. 181.5–184° C./10 mm.; $n_D^{20}$=1.5264; $\alpha_D^{23}$ (10 cm.) = −39.9°.

The fractions of bornyl 2,4-dimethylphenyl ether did not crystallize. A residue of 15 grams remained.

EXAMPLE 11

*Isobornyl 2,4-dimethylphenyl ether*

2 grams of $BF_3$-ether catalyst was added to a stirred and cooled (ice-bath) mixture of 136 grams tricyclene and 122 grams 2,4-dimethylphenol. Exothermic reaction took place, the temperature rising from 0° C. to 18° C. After the mixture had cooled, it was placed in the refrigerator. After sixteen hours the reaction mixture, now solidified, was treated with hot sodium hydroxide solution and distilled, yielding 178 grams (80%) of isobornyl, 2,4-dimethylphenyl ether. Recrystallized from alcohol, the product had M. P. 57.4–57.8° C.

The examples are illustrative, the invention being defined in the following claims.

What I claim is:

1. The process of producing an isobornyl aryl ether from a phenol and a terpene of the class consisting of camphene and tricyclene which comprises reacting the same in the presence of an acid catalyst at a temperature between about −30 and +30° C.

2. The process of producing isobornyl phenyl ether from unsubstituted phenol and a terpene of the class consisting of camphene and tricyclene which comprises condensing phenol with the terpene at a temperature of about −30 to +30° C. in the presence of an acid catalyst.

3. The method of producing an isobornyl aryl ether from an alkyl-substituted phenol and a terpene of the class consisting of camphene and tricyclene which comprises reacting the terpene and the phenol at a temperature of −30 to +30° C. in the presence of an acid catalyst.

4. The process of producing an isobornyl aryl ether from a phenol and a terpene of the class consisting of camphene and tricyclene which comprises reacting the same in the presence of an acid catalyst at a temperature between about −30° and +5° C.

5. The process of producing an aryl ether of bicyclic terpene hydrocarbon which comprises reacting a phenol and a tricyclic terpene in the presence of an acid catalyst at a temperature between about −30° and +5° C.

LELAND J. KITCHEN.

REFERENCES CITED

The following references are of record in the file of this patent:

UNITED STATES PATENTS

| Number | Name | Date |
|---|---|---|
| 2,145,369 | Osterhoff | Jan. 31, 1939 |
| 2,186,132 | Zink | Jan. 9, 1940 |
| 2,320,846 | Borglin | June 1, 1943 |
| 2,488,489 | Borglin | Nov. 15, 1949 |

OTHER REFERENCES

Martin, "Paint Manufacture," vol. 15, 1945, pages 30–32.